US012724262B2

(12) United States Patent
Yoshinari et al.

(10) Patent No.: US 12,724,262 B2
(45) Date of Patent: Sep. 1, 2026

(54) IMAGE PROJECTION SYSTEM

(71) Applicant: FUJIFILM Corporation, Tokyo (JP)

(72) Inventors: Shinichi Yoshinari, Kanagawa (JP); Naoya Shibata, Kanagawa (JP); Shinya Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 319 days.

(21) Appl. No.: 18/528,146

(22) Filed: Dec. 4, 2023

(65) Prior Publication Data

US 2024/0134192 A1 Apr. 25, 2024

Related U.S. Application Data

(63) Continuation of application No. PCT/JP2022/021594, filed on May 26, 2022.

(30) Foreign Application Priority Data

Jun. 21, 2021 (JP) ................................ 2021-102601

(51) Int. Cl.

*G02B 27/01* (2006.01)
*B60K 35/10* (2024.01)
*B60K 35/234* (2024.01)

(52) U.S. Cl.

CPC ........ *G02B 27/0101* (2013.01); *B60K 35/234* (2024.01); *B60K 35/10* (2024.01)

(58) Field of Classification Search

CPC ..... G02B 27/00–648; G02B 2027/0105–0198; G03B 21/00–64; H04N 9/31–3197; B60K 35/00–90

See application file for complete search history.

(56) References Cited

U.S. PATENT DOCUMENTS 5,013,134 A 5/1991 Smith
6,404,472 B1 * 6/2002 Andreatta ............ G02B 5/3033 252/585
2017/0097505 A1 4/2017 Takamatsu et al.

(Continued)

FOREIGN PATENT DOCUMENTS

DE 102014214510 A1 1/2016
EP 3730333 A1 10/2020

(Continued)

OTHER PUBLICATIONS

International Search Report issued in PCT/JP2022/021594 on Aug. 9, 2022.

(Continued)

*Primary Examiner* — Christopher A Lamb, II
(74) *Attorney, Agent, or Firm* — Edwards Neils LLC; Jean C. Edwards, Esq.

(57) ABSTRACT

An image projection system in which a projection image is easier to see. An image projection system includes an image projection device which emits projection light that is linearly polarized light; a screen which is irradiated with the projection light emitted from the image projection device; and a light absorption anisotropic layer which is disposed between the image projection device and the screen and through which the projection light passes, the light absorption anisotropic layer contains a dichroic substance, and a transmittance central axis of the light absorption anisotropic layer is in a direction toward the screen.

21 Claims, 5 Drawing Sheets

(56) References Cited

U.S. PATENT DOCUMENTS

| | | | | |
|---|---|---|---|---|
| 2018/0180878 | A1* | 6/2018 | Yokoe | B60K 35/60 |
| 2019/0041638 | A1* | 2/2019 | Ono | G02B 5/208 |
| 2020/0122555 | A1* | 4/2020 | Nimura | G02B 5/30 |
| 2020/0318011 | A1 | 10/2020 | Shibata et al. | |

FOREIGN PATENT DOCUMENTS

| | | | |
|---|---|---|---|
| JP | 3-209210 | A | 9/1991 |
| JP | 2007-057979 | A | 3/2007 |
| JP | 2016-061978 | A | 4/2016 |
| JP | 2017-187528 | A | 10/2017 |
| JP | 2019-066774 | A | 4/2019 |
| WO | 2015/185083 | A1 | 12/2015 |

OTHER PUBLICATIONS

Written Opinion issued in PCT/JP2022/021594 on Aug. 9, 2022.

International Preliminary Report on Patentability completed by WIPO on Dec. 14, 2023 in connection with International Patent Application No. PCT/JP2022/021594.

Extended European Search Report issued by the European Patent Office, on Sep. 27, 2024, in connection with European Patent Application No. 22828141.6.

Office Action, which was issued by the Chinese Intellectual Property Office on Apr. 23, 2026, in connection with Chinese Patent Application No. 202280043856.X.

* cited by examiner

IMAGE PROJECTION SYSTEM

CROSS-REFERENCE TO RELATED APPLICATIONS

This application is a Continuation of PCT International Application No. PCT/JP2022/021594 filed on May 26, 2022, which was published under PCT Article 21(2) in Japanese, and which claims priority under 35 U.S.C. § 119(a) to Japanese Patent Application No. 2021-102601 filed on Jun. 21, 2021. The above applications are hereby expressly incorporated by reference, in their entirety, into the present application.

BACKGROUND OF THE INVENTION

1. Field of the Invention

The present invention relates to an image projection system.

2. Description of the Related Art

Image projection systems which project various images, textual information, and the like on a screen have been widely used.

For example, in JP1991-209210A (JP-H3-209210A), a so-called head-up display in which an image projection device projects various kinds of information as an image on a windshield glass or the like to transmit the information to a driver has been developed as an in-vehicle display.

SUMMARY OF THE INVENTION

In image projection systems, a projection image is required to be easier to see.

The inventors have conducted studies on the image projection system described in JP1991-209210A (JP-H3-209210A), and found that the above-described characteristics are not always sufficient, and further improvements are required.

In view of the above-described circumstances, an object of the present invention is to provide an image projection system in which a projection image is easier to see.

The inventors have found that the above-described object can be accomplished with the following configurations.

(1) An image projection system comprising: an image projection device which emits projection light that is linearly polarized light;
 a screen which is irradiated with the projection light emitted from the image projection device; and
 a light absorption anisotropic layer which is disposed between the image projection device and the screen and through which the projection light passes,
 in which the light absorption anisotropic layer contains a dichroic substance, and
 a transmittance central axis of the light absorption anisotropic layer is in a direction toward the screen.

(2) The image projection system according to (1), in which an irradiation region for the projection light is present on the screen in a direction in which the transmittance central axis of the light absorption anisotropic layer extends.

(3) The image projection system according to (1) or (2), in which an angle formed by a line connecting a center of a transmission window of the image projection device and a center of an irradiation region for the projection light on the screen and the transmittance central axis of the light absorption anisotropic layer is 0° to 30°.

(4) The image projection system according to any one of (1) to (3), in which the light absorption anisotropic layer contains the dichroic substance, and
 a content of the dichroic substance is 10.0% by mass or greater with respect to a total mass of the light absorption anisotropic layer.

(5) The image projection system according to any one of (1) to (4), in which the screen includes a reflective layer which reflects the projection light.

(6) The image projection system according to (5), in which the reflective layer is a cholesteric liquid crystal layer or a multilayer reflective film.

(7) The image projection system according to any one of (1) to (6), further comprising: a B-plate which is disposed between the image projection device and the light absorption anisotropic layer and through which the projection light passes.

(8) The image projection system according to any one of (1) to (7), in which the image projection system is used as an in-vehicle head-up display.

(9) The image projection system according to (8), in which a windshield of a vehicle is used as the screen.

According to the present invention, it is possible to provide an image projection system in which a projection image is easier to see.

DESCRIPTION OF THE PREFERRED EMBODIMENTS

Hereinafter, the present invention will be described in detail.

The following description of configuration requirements is based on representative embodiments of the present invention, but the present invention is not limited to the embodiments.

In the present specification, a numerical range expressed using "to" means a range including numerical values before and after "to" as a lower limit value and an upper limit value.

In the present specification, the term "(meth)acrylic" is used to mean "either or both of acrylic and methacrylic". The term "(meth)acryloyl" is used to mean "either or both of acryloyl and methacryloyl".

The bonding direction of a divalent group (for example, —COO—) described in the present specification is not particularly limited. For example, in a case where L in X-L-Y is —COO— and then in a case where the position bonded to the X side is defined as *1 and the position bonded to the Y side is defined as *2, L may be *1-O—CO-*2 or *1-CO—O-*2.

In the present invention, visible light is light at a wavelength that is visible to the human eyes among electromagnetic waves, and light in a wavelength range of 380 to 780 nm. Invisible light is light in a wavelength range of less than 380 nm or in a wavelength range of more than 780 nm.

A feature point of an image projection system according to an embodiment of the present invention is that a light absorption anisotropic layer, through which projection light passes, is disposed between an image projection device and a screen.

As will be described later, a transmittance central axis in the light absorption anisotropic layer is in a direction toward the screen, and particularly, in a direction toward a projection light irradiation region on the screen. Therefore, among the projection light emitted from the image projection device, the light that is not parallel to the transmittance central axis is likely to be absorbed, and the light that brightly illuminates the periphery of the irradiation region on which a projection image is projected is absorbed. As a result, the projection image becomes easier to visually recognize.

First Embodiment

Figure 1:
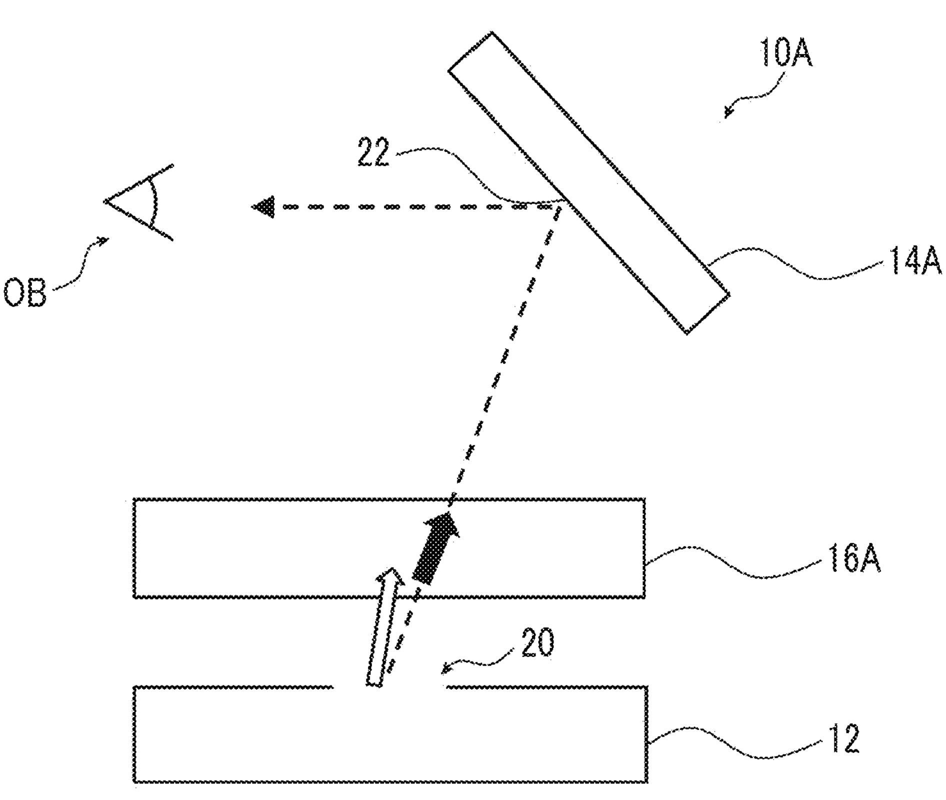
FIG. 1 is a schematic diagram showing an image projection system according to a first embodiment.

FIG. 1 shows a schematic diagram of an image projection system according to a first embodiment of the present invention.

An image projection system 10A shown in FIG. 1 has an image projection device 12, a screen 14A, and a light absorption anisotropic layer 16A. As indicated by the dashed line in FIG. 1, most of the projection light emitted from a transmission window 20 of the image projection device 12 is applied to a predetermined projection light irradiation region on the screen 14A through the light absorption anisotropic layer 16A and is reflected on the irradiation region. As a result, an observer OB can observe a virtual image of the image projected on the screen 14A. More specifically, in the image projection system 10A shown in FIG. 1, the projection light is emitted toward an irradiation region 22 consisting of a part of the screen 14A shown in FIG. 2, and is reflected on the irradiation region 22. As a result, the observer OB can observe a projection image on the irradiation region 22 for projection light on the screen 14A. That is, the irradiation region 22 corresponds to a region in the screen 14A on which the projection light is projected (reflected).

The black arrow shown in the light absorption anisotropic layer 16A indicates a transmittance central axis. As will be described later, the transmittance central axis denotes a direction in which the transmittance is the highest in a case where the transmittance is measured by changing the inclination angle (polar angle) and the inclination direction (azimuthal angle) with respect to the normal direction of the light absorption anisotropic layer 16A. Therefore, in a case where light travels along the transmittance central axis, the light is hardly absorbed. On the contrary, as the light passing through the light absorption anisotropic layer 16A deviates more from the parallel relationship to the transmittance central axis, the light is more easily absorbed.

In the image projection system 10A shown in FIG. 1, the traveling direction of the projection light emitted as indicated by the dashed line from the transmission window 20 of the image projection device 12 is parallel to the transmittance central axis of the light absorption anisotropic layer 16A. Therefore, such projection light is hardly absorbed by the light absorption anisotropic layer 16A.

Meanwhile, among the projection light emitted from the transmission window 20 of the image projection device 12, there is light that is not emitted in a desired direction as indicated by the open arrow. Such light brightly illuminates the periphery of the region where the observer observes the projection image, and as a result, it becomes difficult for the observer to visually recognize the projection image due to the decreased contrast of the projection image.

In the image projection system 10A, the transmittance central axis of the light absorption anisotropic layer 16A is in a direction toward the screen. More specifically, the screen is disposed in a direction in which the transmittance central axis extends. Therefore, it is possible to suppress the transmission of the light emitted in a direction different from a desired direction, indicated by the open arrow, to the screen 14A-side, and as a result, the observer can easily visually recognize the projection image due to the increased contrast of the projection image.

In FIG. 1, in a direction in which the transmittance central axis of the light absorption anisotropic layer 16A extends, there is the irradiation region 22 for projection light on the screen 14A.

In addition, in FIG. 1, the line connecting the center of the transmission window 20 of the image projection device 12 and the center of the irradiation region 22 for projection light on the screen 14A is parallel to the transmittance central axis of the light absorption anisotropic layer 16A. Further, the present invention is not limited to the aspect in which the above line and axis are in parallel, and the angle formed by: the line connecting the center of the transmission window 20 of the image projection device 12 and the center of the irradiation region 22 for projection light on the screen 14A; and the transmittance central axis of the light absorption anisotropic layer 16A is preferably 0° to 30°, more preferably 0° to 20°, and even more preferably 0° to 15°. Within the above range, the effect of the present invention is further improved.

The center of the transmission window 20 of the image projection device 12 represents a position of the center of a circumscribed circle when the circumscribed circle is inscribed in the transmission window 20.

In addition, the center of the irradiation region 22 for projection light on the screen 14A represents a position of the center of a circumscribed circle when the circumscribed circle is inscribed in the irradiation region 22.

Further, an angle θ formed by the transmittance central axis of the light absorption anisotropic layer and the normal direction of the surface of the light absorption anisotropic layer is not particularly limited, but is preferably 0° to 60°.

In FIG. 1, the image projection device 12 and the light absorption anisotropic layer 16A are spaced apart from each other, but the present invention is not limited to this aspect. The image projection device 12 and the light absorption anisotropic layer 16A may be in contact with each other. In addition, the image projection device 12 and the light absorption anisotropic layer 16A may be bonded to each other via a pressure sensitive adhesive layer or an adhesive layer.

Hereinafter, members (the image projection device 12, screen 14A, and light absorption anisotropic layer 16A) constituting the image projection system 10A will be described in detail.

(Image Projection Device)

The configuration of the image projection device 12 is not particularly limited as long as the device can emit projection light that is linearly polarized light, and known image display devices can be used.

The image projection device 12 may include a polarizer in order to emit projection light that is linearly polarized light.

The polarizer used in the present invention is not particularly limited as long as it is a member having a function of converting light into specific linearly polarized light, and known polarizers of the related art can be used.

Examples of the polarizer include an iodine-based polarizer, a dye-based polarizer using a dichroic dye, and a polyene-based polarizer. The iodine-based polarizer and the dye-based polarizer include a coating type polarizer and a stretching type polarizer, and any of these is applicable. A polarizer in which a dichroic organic coloring agent is aligned by using alignment of the liquid crystal compound is preferable as the coating type polarizer, and a polarizer prepared by adsorbing iodine or a dichroic dye on polyvinyl alcohol and stretching the polyvinyl alcohol is preferable as the stretching type polarizer.

In the image projection device 12, the position where the polarizer is disposed is not particularly limited, and may be, for example, on the transmission window 20 of the image projection device 12.

In a case where a liquid crystal display device is included in the image projection device 12, as the polarizer, a polarizer disposed on the viewing side of the liquid crystal display device may be used.

In the image projection device 12, projection light is emitted from the transmission window 20.

The transmission window 20 may be a simple opening portion or a transparent portion through which projection light transmits. The transparent portion may be formed of a glass substrate, a transparent resin film, or the like.

The shape of the transmission window 20 in plan view is not particularly limited, and may be a circular shape or a polygonal shape.

The method of changing a virtual image forming distance in the image projection device 12 is not particularly limited, and examples thereof include known methods.

Examples of the method of changing a virtual image forming distance in the image projection device 12 include a method in which a surface (screen) on which an image is generated is moved (see JP2017-021302A), a method in which a plurality of optical paths having different optical path lengths are switched (see WO2015/190157A), a method in which an optical path length is changed by inserting and/or moving mirrors, a method in which a focal length is changed by using an assembled lens as an imaging lens, a method in which the image projection device 12 is moved, a method in which a plurality of projectors having different virtual image forming distances are switched, and a method in which a variable-focal-length lens is used (see WO2010/116912A).

Examples of the image projection device 12 include a liquid crystal on silicon (LCOS) projector, a laser projector, and a liquid crystal projector (liquid crystal display device).

(Screen 14A)

The configuration of the screen 14A is not particularly limited, and examples thereof include a member (for example, a half mirror) which can reflect projection light carrying an image and display the image carried by the projection light as a projection image by the reflected projection light. More specific examples thereof include a glass plate.

In addition, the screen 14A may be a laminated glass in which an intermediate film is disposed between two glass plates. The intermediate film is not particularly limited, and examples of the material for forming the intermediate film include polyvinyl butyral (PVB), an ethylene-vinyl acetate copolymer, a chlorine-containing resin, and polyurethane.

In FIG. 1, the screen 14A has a flat plate shape. However, a part or the whole surface thereof may have a curved surface.

Figure 2:
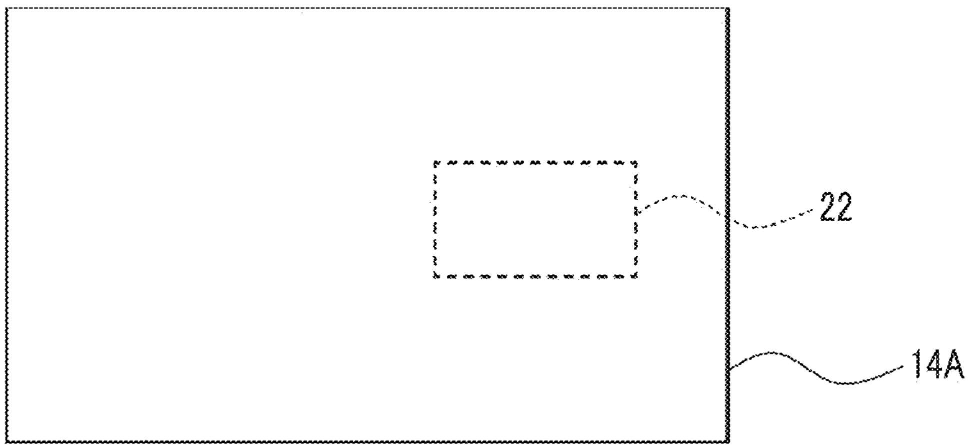
FIG. 2 is a schematic diagram for explaining a screen.

In the screen 14A, as shown in FIG. 2, only a region consisting of a part of the screen may serve as the irradiation region 22 for projection light emitted from the image projection device 12, or the whole surface of the screen may serve as the irradiation region.

As will be described later, in a case where the image display system according to the embodiment of the present invention is used as an in-vehicle head-up display, a windshield of a vehicle can be used as a screen.

(Light Absorption Anisotropic Layer 16A)

The light absorption anisotropic layer 16A has a transmittance central axis, and has higher light transmittance in a direction of the transmittance central axis.

The transmittance central axis denotes a direction in which the transmittance is the highest in a case where the transmittance is measured by changing the inclination angle (polar angle) and the inclination direction (azimuthal angle) with respect to the normal direction of the surface of the light absorption anisotropic layer. Specifically, the Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the normal direction of the surface of the light absorption anisotropic layer is changed for every 1° from −70° to 70° in the surface (the plane that has the transmittance central axis and is orthogonal to the layer surface) including the normal direction of the light absorption anisotropic layer along the azimuthal angle thereof, and the transmittance of the light absorption anisotropic layer is derived. As a result, the direction in which the highest transmittance is exhibited is defined as the transmittance central axis.

Further, the transmittance central axis denotes a direction (the major axis direction of a molecule) of the absorption axis of the dichroic substance contained in the light absorption anisotropic layer.

Figure 3:
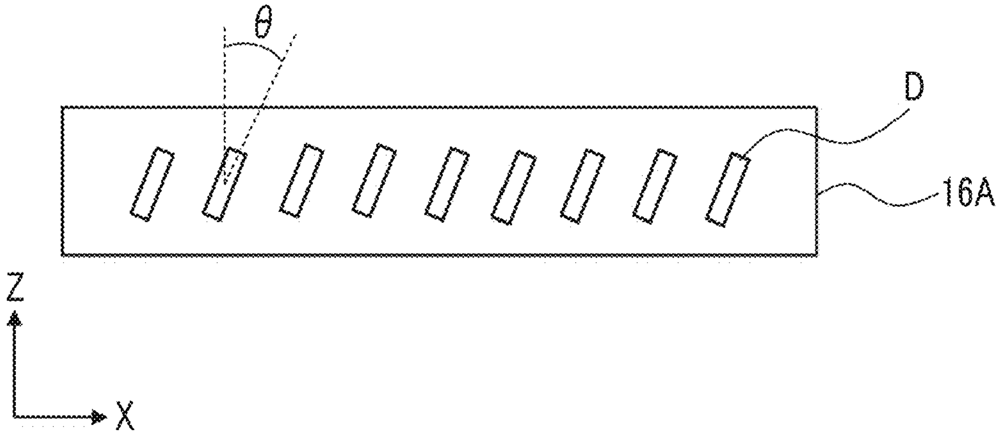
FIG. 3 is a cross-sectional view of an example of a light absorption anisotropic layer.
Figure 4:
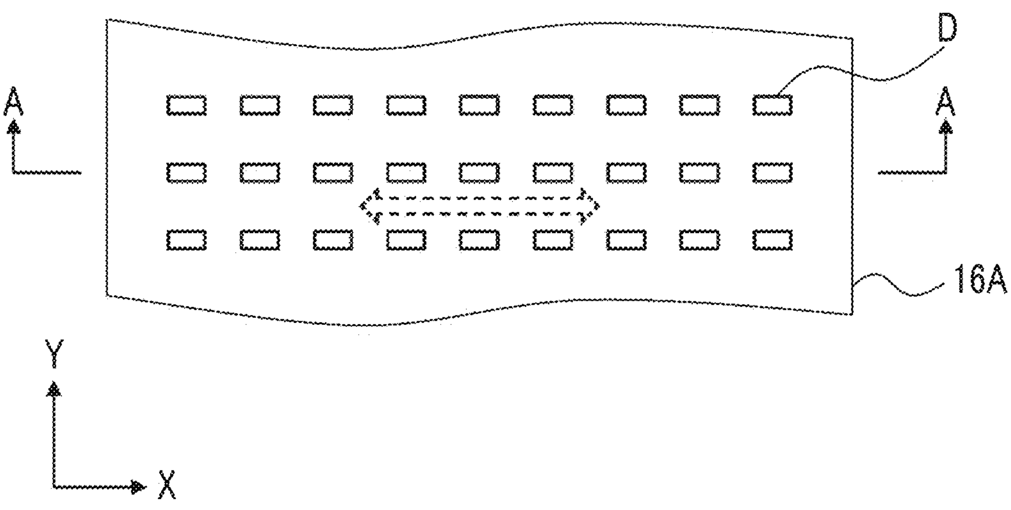
FIG. 4 is a plan view of an example of the light absorption anisotropic layer.

The configuration of the light absorption anisotropic layer 16A is not particularly limited as long as the light absorption anisotropic layer has the above-described transmittance central axis, but the light absorption anisotropic layer 16A preferably contains dichroic substances D as shown in FIGS. 3 and 4.

FIG. 3 is a cross-sectional view of the light absorption anisotropic layer 16A, and FIG. 4 is a plan view of the light absorption anisotropic layer 16A shown in FIG. 3. FIG. 3 is a cross-sectional view taken along line A-A in FIG. 4.

In FIG. 3, the direction X and the direction Z represent directions of two coordinate axes orthogonal to each other on the observation surface. The direction Z is parallel to a thickness direction of the light absorption anisotropic layer 16A.

In FIG. 4, the direction X and the direction Y represent directions of two coordinate axes orthogonal to each other on the observation surface.

The dichroic substance D is a substance which causes a difference in absorption intensity when two linearly polarized light rays having a 90°-difference in the direction of the electric vector of light are applied as will be described later.

In the light absorption anisotropic layer 16A, the dichroic substances D are arranged so that the major axis direction thereof is inclined with respect to the surface of the light absorption anisotropic layer 16A.

More specifically, the direction in which the major axis direction of the dichroic substance D shown in FIGS. 3 and 4 is projected onto the surface of the light absorption anisotropic layer 16A is parallel to the X-axis direction (the left-right direction on the paper surface). Therefore, the X-axis direction (the left-right direction on the paper surface) corresponds to the azimuth in which the transmittance to linearly polarized light is the lowest in the in-plane direction of the light absorption anisotropic layer 16A. That is, the direction of the dashed line, open arrow (the left-right direction on the paper surface) shown in FIG. 4 corresponds to the azimuthal angle at which the transmittance central axis is inclined.

Further, as shown in FIG. 3, in the light absorption anisotropic layer 16A, the dichroic substance D is inclined by θ° with respect to the normal direction of the light absorption anisotropic layer 16A. Therefore, the transmittance central axis of the light absorption anisotropic layer 16A is positioned to be parallel to the X direction in a direction inclined by θ° with respect to the normal direction of the surface of the light absorption anisotropic layer 16A.

It is preferable to adjust the angle θ so that the angle formed by: the above-described line connecting the center of the transmission window 20 of the image projection device 12 and the center of the irradiation region 22 for projection light on the screen 14A; and the transmittance central axis of the light absorption anisotropic layer 16A is within a predetermined range.

The azimuthal angle (the azimuthal angle at which the transmittance central axis is inclined) of the transmittance central axis of the light absorption anisotropic layer 16A is not particularly limited, but it is preferable that the direction in which the transmittance central axis is orthogonally projected onto the surface of the light absorption anisotropic layer 16A (corresponding to the azimuthal angle at which the transmittance central axis is inclined) be parallel to the direction of linearly polarized light that is projection light emitted from the image projection device 12.

Figure 5:
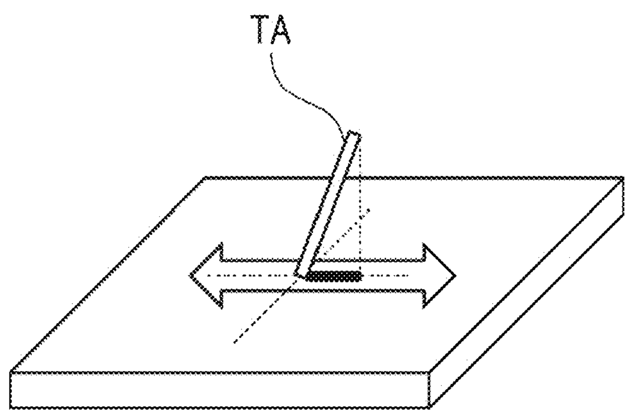
FIG. 5 is a schematic diagram for explaining an azimuth of a transmittance central axis.

More specifically, the direction in which the transmittance central axis is orthogonally projected onto the surface of the light absorption anisotropic layer corresponds to a direction in which a transmittance central axis TA extends when observed from the normal direction of the surface of the light absorption anisotropic layer, and is represented as the black line in FIG. 5. The open arrow in FIG. 5 represents a direction of linearly polarized light, and the direction of the linearly polarized light is preferably parallel to the direction in which the black line extends as shown in FIG. 5.

Further, the transmittance central axis of the light absorption anisotropic layer 16A also corresponds to the direction in which the dichroic substances D are arranged. In other words, the transmittance central axis of the light absorption anisotropic layer 16A also corresponds to the direction in which the major axis direction of the dichroic substance D is aligned.

Therefore, the transmittance central axis of the light absorption anisotropic layer 16A can also be referred to as the absorption axis of the light absorption anisotropic layer 16A.

In addition, in a case where the image display device includes a polarizer, the angle formed by the axial direction in which the transmittance central axis of the light absorption anisotropic layer 16A is projected onto the surface of the light absorption anisotropic layer 16 and the absorption axis of the polarizer included in the image display device is preferably 80° to 90°.

The thickness of the light absorption anisotropic layer 16A is not particularly limited, but is 0.1 to 10 μm in many cases.

Further, examples of the technique of aligning the dichroic substance D in a desired direction include a technique of preparing a polarizer formed of the dichroic substance D and a technique of preparing a guest-host liquid crystal cell. For example, the technique used in the method of preparing a dichroic polarizer described in JP1999-305036A (JP-H11-305036A) or JP2002-090526A and the technique used in the method of preparing a guest-host type liquid crystal display device described in JP2002-099388A or JP2016-027387A can also be used for preparation of the light absorption anisotropic layer 16A.

In order to prevent fluctuation in the light absorption characteristics of the light absorption anisotropic layer 16A due to the use environment, it is preferable to fix the alignment of the dichroic substance D by forming a chemical bond. For example, the alignment can be fixed by advancing polymerization of the host liquid crystal, the dichroic substance D, or a polymerizable component added as desired.

In addition, the light absorption anisotropic layer 16A can be prepared by allowing the dichroic substance D to permeate into the polymer film and aligning the dichroic substance along the alignment of the polymer molecules in the polymer film.

[Dichroic Substance]

In the present invention, as described above, the dichroic substance denotes a compound having different absorbances depending on the direction. The dichroic substance may be immobilized by polymerization in the light absorption anisotropic layer.

The dichroic substance is not particularly limited, and examples thereof include a visible light absorbing substance (a dichroic coloring agent), a light emitting substance (a fluorescent substance and a phosphorescent substance), an ultraviolet absorbing substance, an infrared absorbing substance, a non-linear optical substance, a carbon nanotube, and an inorganic substance (for example, a quantum rod). Further, known dichroic substances (preferably, dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

As the dichroic substance, a dichroic azo coloring agent compound is preferable.

The dichroic azo coloring agent compound denotes an azo coloring agent compound having different absorbances depending on the direction. The dichroic azo coloring agent compound may or may not exhibit liquid crystallinity. In a case where the dichroic azo coloring agent compound exhibits its liquid crystallinity, the dichroic azo coloring agent compound may exhibit any of nematic liquid crystallinity or smectic liquid crystallinity. The temperature range in which the liquid crystal phase is exhibited is preferably from room temperature (approximately 20° C. to 28° C.) to 300° C., and from the viewpoints of handleability and manufacturing suitability, more preferably from 50° C. to 200° C.

In the present invention, two or more kinds of dichroic substances may be used in combination. For example, from the viewpoint of making the color of the light absorption anisotropic layer to be obtained closer to black, it is preferable to use at least one dichroic substance having a maximal absorption wavelength in a wavelength range of 370 nm or greater and less than 500 nm and at least one dichroic substance having a maximal absorption wavelength in a wavelength range of 500 nm or greater and less than 700 nm in combination.

As will be described later, the light absorption anisotropic layer can be formed by using a composition for forming a light absorption anisotropic layer. The dichroic substance may contain a crosslinkable group in the composition for forming a light absorption anisotropic layer. In a case where the dichroic substance has a crosslinkable group, the dichroic substance in a predetermined alignment state can be immobilized in the formation of the light absorption anisotropic layer using the composition for forming a light absorption anisotropic layer.

Specific examples of the crosslinkable group include a (meth)acryloyl group, an epoxy group, an oxetanyl group, and a styryl group. Among these, a (meth)acryloyl group is preferable.

The content of the dichroic substance in the light absorption anisotropic layer is not particularly limited, and is 5.0% by mass or greater with respect to the total mass of the light absorption anisotropic layer in many cases. From the viewpoint that the projection image is easier to see (hereinafter, also referred to as "from the viewpoint that the effect of the present invention is further improved"), the content of the dichroic substance in the light absorption anisotropic layer is preferably 10.0% by mass or greater, more preferably 13.0% to 35.0% by mass, and even more preferably 17.0% to 30.0% by mass.

[Liquid Crystal Compound]

The light absorption anisotropic layer preferably contains a liquid crystal compound. In this manner, the dichroic substance can be aligned with a high alignment degree while the precipitation of the dichroic substance is suppressed.

Both a polymer liquid crystal compound and a low-molecular-weight liquid crystal compound can be used as the liquid crystal compound, and a polymer liquid crystal compound is preferable from the viewpoint that the alignment degree can be increased. Further, a polymer liquid crystal compound and a low-molecular-weight liquid crystal compound may be used in combination as the liquid crystal compound.

Here, the "polymer liquid crystal compound" denotes a liquid crystal compound having a repeating unit in the chemical structure.

In addition, the "low-molecular-weight liquid crystal compound" denotes a liquid crystal compound having no repeating unit in the chemical structure.

Examples of the polymer liquid crystal compound include thermotropic liquid crystal polymers described in JP2011-237513A and polymer liquid crystal compounds described in paragraphs to of WO2018/199096A.

Examples of the low-molecular-weight liquid crystal compound include liquid crystal compounds described in paragraphs [0072] to [0088] of JP2013-228706A. Among these, a smectic liquid crystal compound exhibiting is preferable.

From the viewpoint of a further increase of the alignment degree of the dichroic substance, a polymer liquid crystal compound having a repeating unit represented by Formula (1) (hereinafter, also simply referred to as "repeating unit (1)") is preferable as the liquid crystal compound.

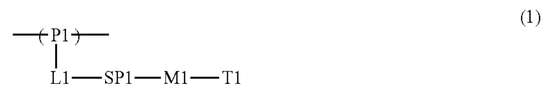

(1)

In Formula (1), P1 represents a main chain of the repeating unit, L1 represents a single bond or a divalent linking group, SP1 represents a spacer group, M1 represents a mesogenic group, and T1 represents a terminal group.

Specific examples of the main chain of the repeating unit represented by P1 include groups represented by Formulae (P1-A) to (P1-D). Among these, from the viewpoints of diversity and handleability of a monomer serving as a raw material, a group represented by Formula (P1-A) is preferable.

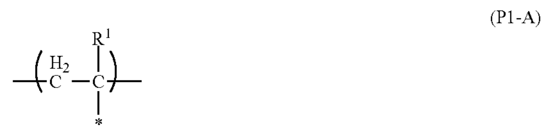

(P1-A)

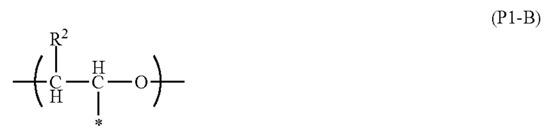

(P1-B)

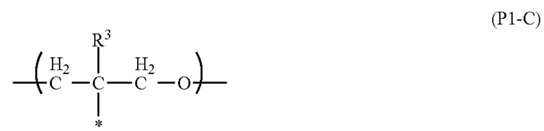

(P1-C)

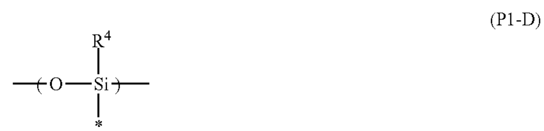

(P1-D)

In Formulae (P1-A) to (P1-D), the symbol "*" denotes a bonding position to L1 in Formula (1).

In Formulae (P1-A) to (P1-D), $R^1$, $R^2$, $R^3$, and $R^4$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

The group represented by Formula (P1-A) is preferably a unit of a partial structure of a poly(meth)acrylic acid ester obtained by polymerization of a (meth)acrylic acid ester.

The group represented by Formula (P1-B) is preferably an ethylene glycol unit formed by ring-opening polymerization of an epoxy group of a compound having the epoxy group.

The group represented by Formula (P1-C) is preferably a propylene glycol unit formed by ring-opening polymerization of an oxetane group of a compound having the oxetane group.

The group represented by Formula (P1-D) is preferably a siloxane unit of a polysiloxane obtained by polycondensation of a compound having at least one of an alkoxysilyl group or a silanol group. Here, examples of the compound having at least one of an alkoxysilyl group or a silanol group include a compound having a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

In Formula (1), L1 represents a single bond or a divalent linking group.

Examples of the divalent linking group represented by L1 include —C(O)O—, —O—, —S—, —C(O)$NR^3$—, —$SO_2$—, and —$NR^3R^4$—. In the formulae, $R^3$ and $R^4$ each independently represent a hydrogen atom or an alkyl group having 1 to 6 carbon atoms which may have a substituent.

In a case where P1 is a group represented by Formula (P1-A), L1 is preferably a group represented by —C(O)O— from the viewpoint of a further increase of the alignment degree of the dichroic substance.

In a case where P1 is a group represented by any of Formula (P1-B) to Formula (P1-D), L1 is preferably a single bond from the viewpoint of a further increase of the alignment degree of the dichroic substance.

In Formula (1), the spacer group represented by SP1 preferably includes at least one structure selected from the group consisting of an oxyethylene structure, an oxypropylene structure, a polysiloxane structure, and an alkylene fluoride structure, from the viewpoints of easily exhibiting liquid crystallinity, availability of raw materials, and the like.

Here, the oxyethylene structure represented by SP1 is preferably a group represented by *—$(CH_2—CH_2O)_{n1}$—*. In the formula, n1 represents an integer of 1 to 20, and "*" represents a bonding position to L1 or M1 in Formula (1). From the viewpoint of a further increase of the alignment degree of the dichroic substance, n1 is preferably an integer of 2 to 10, more preferably an integer of 2 to 4, and even more preferably 3.

In addition, the oxypropylene structure represented by SP1 is preferably a group represented by *—$(CH(CH_3)—CH_2O)_{n2}$—* from the viewpoint of a further increase of the alignment degree of the dichroic substance. In the formula, n2 represents an integer of 1 to 3, and * represents a bonding position to L1 or M1.

In addition, the polysiloxane structure represented by SP1 is preferably a group represented by *—$(Si(CH_3)_2—O)_{n3}$—* from the viewpoint of a further increase of the alignment degree of the dichroic substance. In the formula, n3 represents an integer of 6 to 10, and * represents a bonding position to L1 or M1.

In addition, the alkylene fluoride structure represented by SP1 is preferably a group represented by *—$(CF_2—CF_2)_{n4}$—* from the viewpoint of a further increase of the alignment degree of the dichroic substance. In the formula, n4 represents an integer of 6 to 10, and * represents a bonding position to L1 or M1.

In Formula (1), the mesogenic group represented by M1 is a group showing the main skeleton of liquid crystal molecules contributing to the formation of liquid crystal. The liquid crystal molecules exhibit liquid crystallinity which is in an intermediate state (mesophase) between a crystal state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

For example, a group having at least one cyclic structure selected from the group consisting of an aromatic hydrocarbon group, a heterocyclic group, and an alicyclic group is preferable as the mesogenic group.

From the viewpoint of a further increase of the alignment degree of the dichroic substance, the mesogenic group preferably has an aromatic hydrocarbon group, more preferably 2 to 4 aromatic hydrocarbon groups, and even more preferably 3 aromatic hydrocarbon groups.

From the viewpoints of exhibition of liquid crystallinity, adjustment of liquid crystal phase transition temperature, availability of raw materials, and synthetic suitability, and from the viewpoint of a further increase of the alignment degree of the dichroic substance, the mesogenic group is preferably a group represented by Formula (M1-A) or Formula (M1-B), and more preferably a group represented by Formula (M1-B).

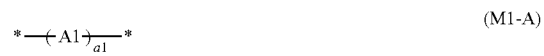

(M1-A)

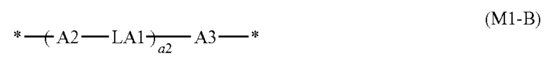

(M1-B)

In Formula (M1-A), A1 is a divalent group selected from the group consisting of an aromatic hydrocarbon group, a heterocyclic group, and an alicyclic group. These groups may be substituted with a substituent such as an alkyl group, an alkyl fluoride group, or an alkoxy group.

The divalent group represented by A1 is preferably a 4- to 6-membered ring. Further, the divalent group represented by A1 may be a monocycle or a fused ring.

The symbol * represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoints of diversity in design of the mesogenic skeleton, availability of raw materials, and the like, a phenylene group or a naphthylene group is preferable, and a phenylene group is more preferable.

The divalent heterocyclic group represented by A1 may be either aromatic or non-aromatic, and is preferably a divalent aromatic heterocyclic group from the viewpoint of a further increase of the alignment degree of the dichroic substance.

Examples of the atom other than the carbon atom of the divalent aromatic heterocyclic group include a nitrogen atom, a sulfur atom, and an oxygen atom. In a case where the aromatic heterocyclic group has a plurality of atoms constituting a ring other than the carbon atom, these atoms may be the same or different from each other.

Specific examples of the divalent aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or greater, a plurality of A1's may be the same or different from each other.

In Formula (M1-B), A2 and A3 each independently represent a divalent group selected from the group consisting of an aromatic hydrocarbon group, a heterocyclic group, and an alicyclic group. Since specific examples and preferable aspects of A2 and A3 are the same as those of A1 of Formula (M1-A), the description thereof will be omitted.

In Formula (M1-B), a2 represents an integer of 1 to 10. In a case where a2 is 2 or greater, a plurality of A2's may be the same or different from each other, a plurality of A3's may be the same or different from each other, and a plurality of LA1's may be the same or different from each other. From the viewpoint of a further increase of the alignment degree of the dichroic substance, a2 is preferably an integer of 2 or greater, and more preferably 2.

In Formula (M1-B), in a case where a2 is 1, LA1 is a divalent linking group. In a case where a2 is 2 or greater, a plurality of LA1's each independently represent a single bond or a divalent linking group, and at least one of the plurality of LA1's is a divalent linking group. In a case where a2 is 2, it is preferable that one of the two LA1' s be a divalent linking group and the other of the two LA1's be a single bond, from the viewpoint of a further increase of the alignment degree of the dichroic substance.

In Formula (M1-B), examples of the divalent linking group represented by LA1 include $—O—$, $—(CH_2)_g—$, $—(CF_2)_g—$, $—Si(CH_3)_2—$, $—(Si(CH_3)_2O)_g—$, $—(OSi(CH_3)_2)_g—$ (g represents an integer of 1 to 10), —N(Z)—, —C(Z)=C(Z')—, —C(Z)=N—, $—C(Z)_2—C(Z')_2—$, —C(O)—, —OC(O)—, —O—C(O)O—, —N(Z)C(O)—, —C(Z)=C(Z')—C(O)O—, —C(Z)=N—, —C(Z)=C(Z')—C(O)N(Z")—, —C(Z)=C(Z')—C(O)—S—, —C(Z)=N—N=C(Z')— (Z, Z', and Z" each independently represent a hydrogen atom, a C1 to C4 alkyl group, a cycloalkyl group, an aryl group, a cyano group, or a halogen atom), —C≡C—, —N=N—, —S—, —S(O)—, —S(O)(O)—, —(O)S(O)O—, —O(O)S(O)O—, and —SC(O). Among these, —C(O)O— is preferable from the viewpoint of a further increase of the alignment degree of the dichroic substance. LA1 may be a group formed by combining two or more of the above groups.

In Formula (1), examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group. Specific examples of the linking group are the same as those for L1 and SP1 described above, and A represents a (meth)acryloyloxy group).

From the viewpoint of a further increase of the alignment degree of the dichroic substance, T1 is preferably an alkoxy group having 1 to 10 carbon atoms, more preferably an alkoxy group having 1 to 5 carbon atoms, and even more preferably a methoxy group.

The terminal groups may be further substituted by the above groups or a polymerizable group described in JP2010-244038A.

T1 is preferably a polymerizable group from the viewpoint of further enhancing the adhesiveness to the adjacent layer and improving the cohesive force of the film.

The polymerizable group is not particularly limited, but is preferably a polymerizable group which is radically polymerizable or cationically polymerizable.

As the radically polymerizable group, generally known radically polymerizable groups can be used, and suitable examples thereof include an acryloyl group and a methacryloyl group. In this case, an acryloyl group is generally known to have a high polymerization rate and therefore the acryloyl group is preferable from the viewpoint of improving productivity. However, a methacryloyl group can also be used as the polymerizable group.

As the cationically polymerizable group, generally known cationically polymerizable groups can be used, and specific examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is preferable.

From the viewpoint of a further increase of the alignment degree of the dichroic substance, the weight-average molecular weight (Mw) of the polymer liquid crystal compound having a repeating unit represented by Formula (1) is preferably 1,000 to 500,000, and more preferably 2,000 to 300,000. In a case where the Mw of the polymer liquid crystal compound is in the above-described range, the polymer liquid crystal compound is easily handled.

In particular, from the viewpoint of suppressing the occurrence of cracking during coating, the weight-average molecular weight (Mw) of the polymer liquid crystal compound is preferably 10,000 or greater, and more preferably 10,000 to 300,000.

In addition, from the viewpoint of the temperature latitude of the alignment degree, the weight-average molecular weight (Mw) of the polymer liquid crystal compound is preferably less than 10,000 and more preferably 2,000 or greater and less than 10,000.

Here, in the present invention, the weight-average molecular weight and the number-average molecular weight are values measured by gel permeation chromatography (GPC).

Solvent (eluent): N-methylpyrrolidone

Device name: TOSOH HLC-8220GPC

Column: Three columns TOSOH TSKgel Super AWM-H (6 mm×15 cm) are connected and used.

Column temperature: 25° C.

Sample concentration: 0.1% by mass

Flow rate: 0.35 mL/min

Calibration curve: A calibration curve made by 7 samples of TSK standard polystyrene manufactured by TOSOH Corporation, Mw of which is 2,800,000 to 1,050 (Mw/Mn=1.03 to 1.06), is used.

The liquid crystal compound may be a polymer of a liquid crystal compound having a polymerizable group (polymerizable liquid crystal compound).

In a case where the light absorption anisotropic layer contains a liquid crystal compound, the content of the liquid crystal compound is preferably 50% to 99% by mass, and more preferably 75% to 90% by mass with respect to the total mass of the light absorption anisotropic layer from the viewpoint that the effect of the present invention is further improved.

[Other Components]

The light absorption anisotropic layer may contain other components in addition to the components described above. Examples of other components include a vertical alignment agent and a leveling agent.

Examples of the vertical alignment agent include a boronic acid compound and an onium salt.

A compound represented by Formula (A) is preferable as the boronic acid compound.

Formula (A)

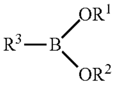

In Formula (A), $R^1$ and $R^2$ each independently represent a hydrogen atom, a substituted or unsubstituted aliphatic hydrocarbon group, a substituted or unsubstituted aryl group, or a substituted or unsubstituted heterocyclic group. $R^3$ represents a substituent containing a (meth)acrylic group.

Specific examples of the boronic acid compound include boronic acid compounds represented by General Formula (I) described in paragraphs to of JP2008-225281A.

A compound represented by Formula (B) is preferable as the onium salt.

Formula (B)

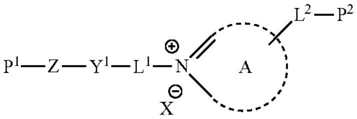

In Formula (B), the ring A represents a quaternary ammonium ion consisting of a nitrogen-containing heterocyclic ring. $X^-$ represents an anion. $L^1$ represents a divalent linking group. $L^2$ represents a single bond or a divalent linking group. $Y^1$ represents a divalent linking group having a 5- or 6-membered ring as a partial structure. Z represents a divalent linking group having 2 to 20 alkylene groups as a partial structure. $P^1$ and $P^2$ each independently represent a monovalent substituent having a polymerizable ethylenically unsaturated bond.

Specific examples of the onium salt include the onium salts described in paragraphs [0052] to [0058] of JP2012-208397A, the onium salts described in paragraphs [0024] to [0055] of JP2008-026730A, and the onium salts described in JP2002-037777A.

In a case where the light absorption anisotropic layer contains a liquid crystal compound and a vertical alignment agent, the content of the vertical alignment agent is preferably 0.1% to 400% by mass, and more preferably 0.5% to 350% by mass with respect to the total mass of the liquid crystal compound.

The vertical alignment agents may be used alone or in combination of two or more kinds thereof. In a case where two or more kinds of vertical alignment agents are used, the total amount thereof is preferably within the above range.

The light absorption anisotropic layer may contain a leveling agent. In a case where the composition for forming a light absorption anisotropic layer (light absorption anisotropic layer) to be described later contains a leveling agent, surface roughening due to the drying air applied to the surface of the light absorption anisotropic layer is suppressed, and the dichroic substance is more uniformly aligned.

The leveling agent is not particularly limited, but a leveling agent containing a fluorine atom (fluorine-based leveling agent) or a leveling agent containing a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent.

Specific examples of the leveling agent include the compounds described in paragraphs [0046] to [0052] of JP2004-331812A and the compounds described in paragraphs [0038] to [0052] of JP2008-257205A.

In a case where the light absorption anisotropic layer contains a liquid crystal compound and a leveling agent, the content of the leveling agent is preferably 0.001% to 10% by mass, and more preferably 0.01% to 5% by mass with respect to the total mass of the liquid crystal compound.

The leveling agents may be used alone or in combination of two or more kinds thereof. In a case where two or more kinds of leveling agents are used, the total amount thereof is preferably within the above range.

[Composition for Forming Light Absorption Anisotropic Layer]

The light absorption anisotropic layer is preferably formed by using a composition for forming a light absorption anisotropic layer containing a dichroic substance.

The composition for forming a light absorption anisotropic layer preferably contains a liquid crystal compound, and a solvent and the like to be described later in addition to the dichroic substance, and may further contain other components described above.

Examples of the dichroic substance contained in the composition for forming a light absorption anisotropic layer include a dichroic substance which can be contained in the light absorption anisotropic layer.

The content of the dichroic substance with respect to the total solid content mass of the composition for forming a light absorption anisotropic layer is preferably the same as the content of the dichroic substance with respect to the total mass of the light absorption anisotropic layer.

Here, the "total solid content in the composition for forming a light ab sorption anisotropic layer" denotes components excluding the solvent, and specific examples of the solid content include the dichroic substance, the liquid crystal compound, and the above-described other components.

The liquid crystal compound and other components which can be contained in the composition for forming a light absorption anisotropic layer are respectively the same as the liquid crystal compound and other components which can be contained in the light absorption anisotropic layer.

Examples of the liquid crystal compound include the above-described polymer liquid crystal compound and a liquid crystal compound having a polymerizable group.

It is preferable that the content of the liquid crystal compound and the content of other components with respect to the total solid content mass of the composition for forming a light absorption anisotropic layer be respectively the same as the content of the liquid crystal compound and the content of other components with respect to the total mass of the light absorption anisotropic layer.

From the viewpoint of workability, the composition for forming a light absorption anisotropic layer preferably contains a solvent.

Examples of the solvent include organic solvents such as ketones, ethers, aliphatic hydrocarbons, alicyclic hydrocarbons, aromatic hydrocarbons, carbon halides, esters, alcohols, cellosolves, cellosolve acetates, sulfoxides, amides, and heterocyclic compounds, and water.

These solvents may be used alone or in combination of two or more kinds thereof.

Among these solvents, organic solvents are preferable, and carbon halides or ketones are more preferable.

In a case where the composition for forming a light absorption anisotropic layer contains a solvent, the content of the solvent is preferably 80% to 99% by mass, more preferably 83% to 97% by mass, and even more preferably 85% to 95% by mass with respect to the total mass of the composition for forming a light absorption anisotropic layer.

The composition for forming a light absorption anisotropic layer may contain a polymerization initiator.

The polymerization initiator is not particularly limited, but a photosensitive compound, that is, a photopolymerization initiator is preferable.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

The polymerization initiators may be used alone or in combination of two or more kinds thereof.

In a case where the composition for forming a light absorption anisotropic layer contains a polymerization initiator, the content of the polymerization initiator is preferably 0.01% to 30% by mass, and more preferably 0.1% to 15% by mass with respect to the total solid content of the composition for forming a light absorption anisotropic layer.

[Method of Producing Light Absorption Anisotropic Layer]

The method of producing the light absorption anisotropic layer is not particularly limited, but a method including a step of coating an alignment film with the composition for forming a light absorption anisotropic layer containing a dichroic substance and a liquid crystal compound to form a coating film (hereinafter, also referred to as "coating film forming step") and a step of aligning a liquid crystal component contained in the coating film (hereinafter, also referred to as "aligning step") in this order (hereinafter, also referred to as "present production method") is preferable from the viewpoint of a further increase of the alignment degree of the dichroic substance.

Further, the liquid crystal component is a component containing not only the liquid crystal compound described above but also a dichroic substance having liquid crystallinity.

Hereinafter, the respective steps will be described.

The coating film forming step is a step of coating an alignment film with the composition for forming a light absorption anisotropic layer to form a coating film.

The alignment film is easily coated with the composition for forming a light absorption anisotropic layer by using the composition for forming a light absorption anisotropic layer which contains the above-described solvent or using a liquid-like material such as a melt obtained by heating the composition for forming a light absorption anisotropic layer.

Examples of the coating method using the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

The alignment film may be any film as long as it is a film in which the liquid crystal component which can be contained in the composition for forming a light absorption anisotropic layer is aligned.

The alignment film can be provided by means such as a rubbing treatment performed on a film surface of an organic compound (preferably a polymer), oblique vapor deposition of an inorganic compound, formation of a layer having microgrooves, or accumulation of an organic compound (such as ω-tricosanoic acid, dioctadecylmethylammonium chloride, or methyl stearylate) using a Langmuir-Blodgett method (LB film). Furthermore, there have been known alignment films having an aligning function imparted thereto by applying an electrical field, applying a magnetic field, or light irradiation. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

As the photo-alignment film, a photo-alignment film containing an azobenzene coloring agent, polyvinyl cinnamate, or the like is used.

The dichroic substance in the light absorption anisotropic layer can be aligned by irradiating a photo-alignment layer with ultraviolet rays in an oblique direction at an angle to the normal direction of the photo-alignment layer, generating anisotropy with an inclination with respect to the normal direction of the photo-alignment layer, and aligning the light absorption anisotropic layer thereon.

In addition, a liquid crystal layer such as a liquid crystal layer in which a liquid crystal compound is hybrid-aligned can also be used as the alignment film.

The aligning step is a step of aligning the liquid crystal component (particularly, the dichroic substance) contained in the coating film. In the aligning step, the dichroic substance is considered to be aligned along the liquid crystal compound aligned by the alignment film.

The aligning step may have a drying treatment. By the drying treatment, components such as a solvent can be removed from the coating film. The drying treatment may be performed by a method of allowing the coating film to stand at room temperature for a predetermined time (for example, natural drying) or a method of heating the coating film and/or blowing air to the coating film.

The aligning step preferably has a heating treatment. In this manner, the dichroic substance contained in the coating film is further aligned, and the alignment degree of the dichroic substance is further increased.

From the viewpoint of manufacturing suitability and the like, the heating treatment is preferably performed at 10° C. to 250° C., and more preferably 25° C. to 190° C. Further, the heating time is preferably 1 to 300 seconds, and more preferably 1 to 60 seconds.

The aligning step may have a cooling treatment to be performed after the heating treatment. The cooling treatment is a treatment of cooling the coating film after heating to about room temperature (20° C. to 25° C.). In this manner, the alignment of the dichroic substance contained in the coating film is further fixed, and the alignment degree of the dichroic substance is further increased. The cooling means is not particularly limited, and the cooling can be performed by a known method.

The light absorption anisotropic layer according to the present invention can be obtained by performing the above-described steps.

The present production method may have a step of curing the light absorption anisotropic layer after the aligning step (hereinafter, also referred to as "curing step").

For example, the curing step is performed by heating and/or light irradiation (exposure). Among these, light irradiation is preferably performed to conduct the curing step.

Various light sources such as infrared rays, visible light, and ultraviolet rays can be used as the light source for curing, but ultraviolet rays are preferable. In addition, in the curing, ultraviolet rays may be applied while heating is performed. Otherwise, ultraviolet rays may be applied via a filter which transmits only a component with a specific wavelength.

In addition, exposure may be performed under a nitrogen atmosphere. In a case where curing of the light absorption anisotropic layer proceeds by radical polymerization, inhibition of the polymerization by oxygen is reduced, and thus the exposure is preferably performed under a nitrogen atmosphere.

FIG. 1 shows the aspect in which the projection light is emitted in an oblique direction from the image projection device 12, but the present invention is not limited to this aspect. An aspect in which the projection light is emitted in a vertical direction from the image projection device 12 may be adopted as shown in FIG. 6.

Figure 6:
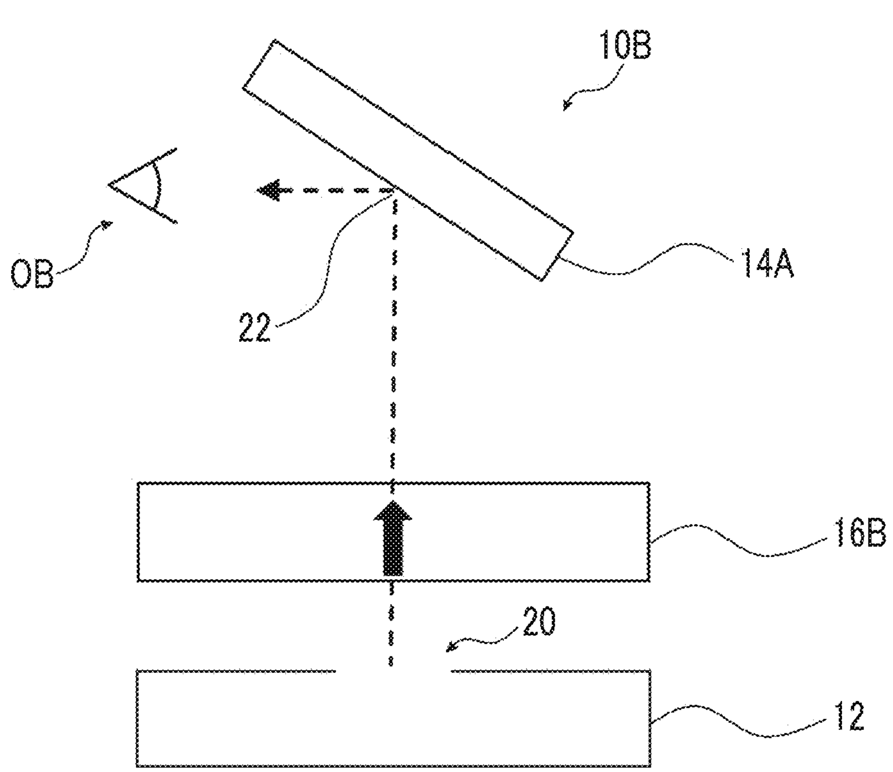
FIG. 6 is a schematic diagram showing a modification of the image projection system according to the first embodiment.

An image projection system 10B shown in FIG. 6 has an image projection device 12, a screen 14A, and a light absorption anisotropic layer 16B disposed between the image projection device 12 and the screen 14A. As shown in FIG. 6, the projection light emitted in a vertical direction from the image projection device 12 is reflected on a projection light irradiation region on the screen 14A through the light absorption anisotropic layer 16B. As a result, an observer OB can observe a virtual image of the image projected on the screen 14A.

In the light absorption anisotropic layer 16B, as indicated by the black arrow in FIG. 6, a transmittance central axis extends in parallel to a direction in which the projection light travels. Consequently, the same effect as in the image projection system 10A shown in FIG. 1 can be obtained.

Second Embodiment

Figure 7:
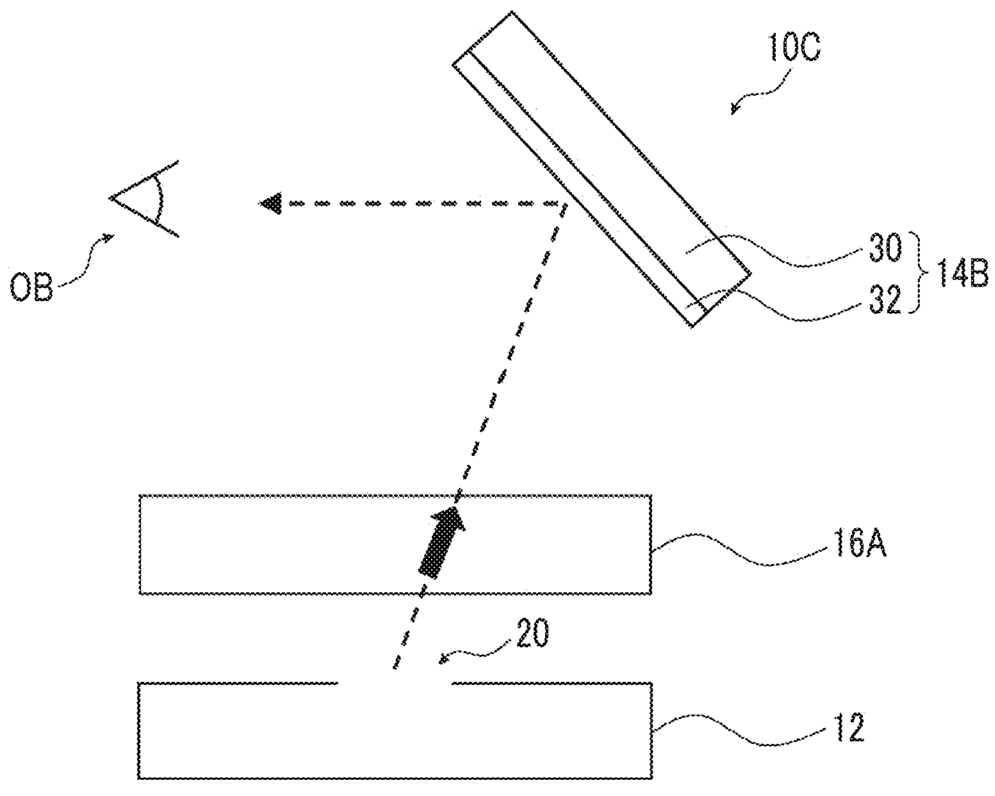
FIG. 7 is a schematic diagram showing an image projection system according to a second embodiment.

FIG. 7 shows a schematic diagram of an image projection system according to a second embodiment of the present invention.

An image projection system 10C shown in FIG. 7 has an image projection device 12, a screen 14B, and a light absorption anisotropic layer 16A.

The image projection system 10C according to the second embodiment has the same members as those of the image projection system 10A according to the first embodiment, except that the screen 14B is included instead of the screen 14A. The same members are denoted by the same reference numerals and description thereof is omitted. Aspects of the screen 14B will be mainly described below in detail.

The screen 14B has a support 30 and a reflective layer 32 disposed on the support 30.

The reflective layer 32 functions to reflect the projection light emitted from the image projection device 12.

Hereinafter, the support 30 and the reflective layer 32 will be described in detail.

(Support 30)

The support 30 is a member which supports the reflective layer 32.

The kind of the support 30 is not particularly limited, and known supports can be used. In particular, a transparent support is preferably used. The transparent support is intended to refer to a support having a visible light transmittance of 60% or greater, which preferably has a visible light transmittance of 80% or greater and more preferably 90% or greater.

Examples of the support 30 include a glass substrate and a resin substrate, and a glass substrate is preferable.

(Reflective Layer)

The configuration of the reflective layer 32 is not particularly limited as long as the reflective layer functions to reflect the projection light emitted from the image projection device 12.

In particular, from the viewpoint that the effect of the present invention is further improved, a cholesteric liquid crystal layer or a multilayer reflective film is preferable as the reflective layer 32.

The cholesteric liquid crystal layer is a layer obtained by immobilizing a cholesteric liquid crystalline phase.

The cholesteric liquid crystalline phase has wavelength-selective reflectivity that exhibits selective reflectivity at a specific wavelength.

A central wavelength $\lambda$ of selective reflection of the cholesteric liquid crystalline phase (selective reflection center wavelength $\lambda$) depends on a pitch P (=helix period) of a helical structure in the cholesteric liquid crystalline phase, and satisfies a relationship of $\lambda = n \times P$ with an average refractive index n of the cholesteric liquid crystalline phase. Therefore, the selective reflection center wavelength can be adjusted by adjusting the pitch of the helical structure. Since the pitch of the cholesteric liquid crystalline phase depends on the kind of chiral agent used together with the liquid crystal compound or the addition concentration thereof, a desired pitch can be obtained by adjusting these.

In addition, a half-width $\Delta\lambda$ (nm) of a selective reflection band (circularly polarized light reflection band) exhibiting selective reflection depends on a refractive index anisotropy $\Delta n$ of the cholesteric liquid crystalline phase and the helical pitch P, and satisfies a relationship of $\Delta\lambda = \Delta n \times P$. Therefore, a width of the selective reflection band can be controlled by adjusting the refractive index anisotropy $\Delta n$ of the cholesteric liquid crystalline phase. The refractive index anisotropy $\Delta n$ can be adjusted by adjusting the kind and mixing ratio of the liquid crystal compound that forms the reflective layer 32 and the temperature during alignment immobilization.

As a method of measuring the sense and pitch of the helix, the methods described in "Introduction to Liquid Crystal Chemistry Experiments" (edited by Japanese Liquid Crystal Society, Sigma Publishing Co., Ltd, 2007, p. 46) and "Liquid Crystal Handbook" (Liquid Crystal Handbook Editorial Committee, Maruzen, p. 196) can be used.

Reflected light by the cholesteric liquid crystalline phase is circularly polarized light. Whether the reflected circularly polarized light is dextrorotatory circularly polarized light or levorotatory circularly polarized light is determined depending on a helical twisted direction of the cholesteric liquid crystalline phase. Regarding the selective reflection of the circularly polarized light by the cholesteric liquid crystalline phase, in a case where the helical twisted direction of the cholesteric liquid crystalline phase is dextrorotatory, the dextrorotatory circularly polarized light is reflected, and in a case where the helical twisted direction of the cholesteric liquid crystalline phase is levorotatory, the levorotatory circularly polarized light is reflected.

The reflective layer 32 may be a cholesteric liquid crystal layer reflecting dextrorotatory circularly polarized light, or may be a cholesteric liquid crystal layer reflecting levorotatory circularly polarized light. Otherwise, the reflective layer 32 may have a reflective layer formed of a cholesteric liquid crystal layer reflecting dextrorotatory circularly polarized light and a reflective layer formed of a cholesteric liquid crystal layer reflecting levorotatory circularly polarized light.

A turning direction of the cholesteric liquid crystalline phase can be adjusted by adjusting the kind of the liquid crystal compound that forms the reflective layer 32 and/or the kind of the chiral agent to be added.

The wavelength range of light to be reflected, that is, the wavelength range of light to be blocked can be widened by sequentially laminating layers in which the selective reflection center wavelengths λ are shifted. In addition, a technique of widening the wavelength range by a method of stepwise changing a helical pitch in the layer, called a pitch gradient method, has also been known, and specific examples thereof include the methods described in Nature 378, 467-469 (1995), JP1994-281814A (JP-H6-281814A), and JP4990426B.

The structure in which a cholesteric liquid crystalline phase is immobilized may be a structure in which the alignment of the liquid crystal compound as a cholesteric liquid crystalline phase is retained, and typically, the structure may be a structure which is obtained by making a polymerizable liquid crystal compound to be in a state where a cholesteric liquid crystalline phase is aligned, polymerizing and curing the polymerizable liquid crystal compound with ultraviolet (UV) irradiation, heating, or the like to form a layer having no fluidity, and concurrently changing the state of the polymerizable liquid crystal compound into a state where the alignment state is not changed by an external field or an external force.

Meanwhile, in the structure in which a cholesteric liquid crystalline phase is immobilized, it is sufficient that the optical properties of the cholesteric liquid crystalline phase are retained, and the liquid crystal compound may not exhibit liquid crystallinity. For example, the molecular weight of the polymerizable liquid crystal compound may be increased by a curing reaction such that the liquid crystallinity thereof is lost.

Examples of the material used for forming the cholesteric liquid crystal layer obtained by immobilizing a cholesteric liquid crystalline phase include a liquid crystal composition containing a liquid crystal compound. The liquid crystal compound is preferably a polymerizable liquid crystal compound.

The liquid crystal composition containing a liquid crystal compound used for forming the cholesteric liquid crystal layer further preferably contains a surfactant. In addition, the liquid crystal composition used for forming the cholesteric liquid crystal layer may further contain a chiral agent, a polymerization initiator, an aligning agent, or the like.

The multilayer reflective film is a film which is formed by laminating a plurality of layers having different refractive indices and has reflecting properties for light in a specific wavelength range.

The multilayer reflective film is preferably a film formed by alternately laminating a layer consisting of a low-refractive-index material and a layer consisting of a high-refractive-index material.

Each layer constituting the multilayer reflective film may be an organic layer composed of an organic substance, or may be an inorganic layer composed of an inorganic substance.

In a case where the reflective layer 32 selectively reflects green light and transmits light other than the green light, the image projection system 10C displays a green monochrome image. In a case where the reflective layer 32 selectively reflects red light and transmits light other than the red light, the image projection system 10C displays a red monochrome image. In a case where the reflective layer 32 selectively reflects blue light and transmits light other than the blue light, the image projection system 10C displays a blue monochrome image.

In addition, in a case where a laminate of a green light reflecting layer, a red light reflecting layer, and a blue light reflecting layer is used as the reflective layer 32, the image projection system 10C displays a full color image.

In FIG. 7, the reflective layer 32 is provided on the whole surface of the support 30. However, the present invention is not limited to this aspect, and the reflective layer 32 may be disposed only on a part of the surface of the support 30. In particular, the reflective layer 32 is preferably disposed on an irradiation region which is irradiated with the projection light emitted from the image projection device 12.

In addition, in FIG. 7, the reflective layer 32 is provided on one surface of the support 30. However, the present invention is not limited to this aspect, and the reflective layer 32 may be interposed between two supports 30.

Third Embodiment

Figure 8:
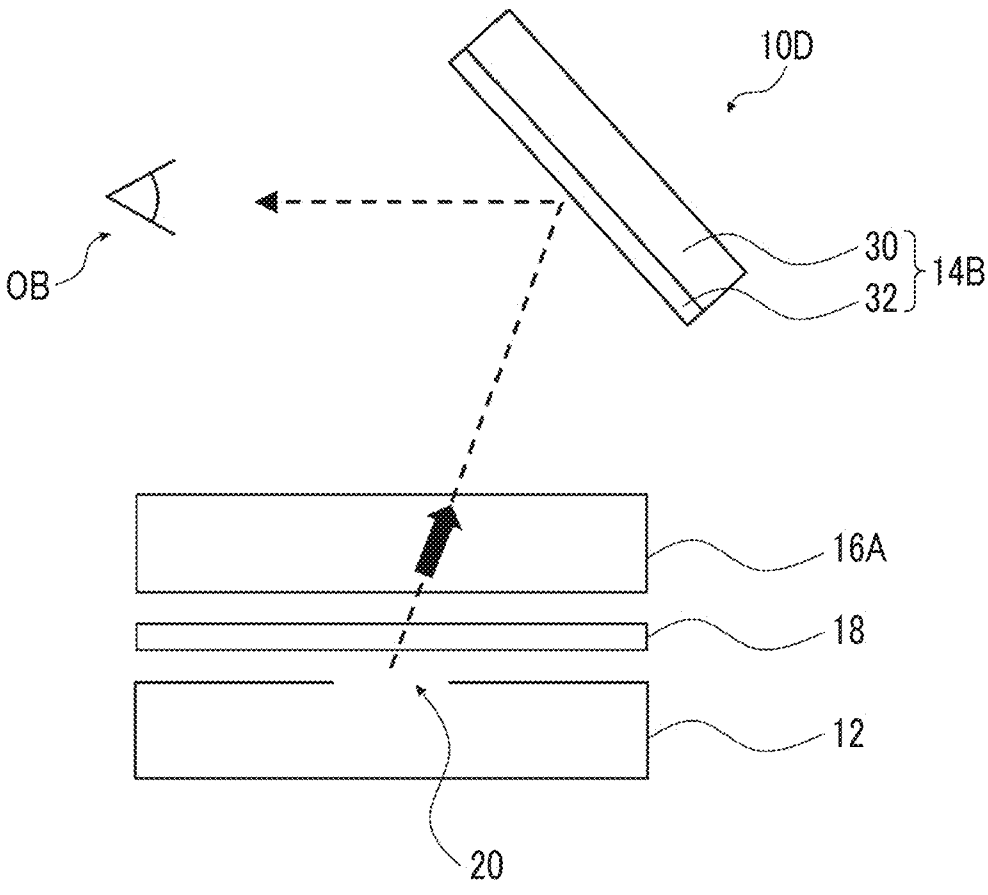
FIG. 8 is a schematic diagram showing an image projection system according to a third embodiment.

FIG. 8 shows a schematic diagram of an image projection system according to a third embodiment of the present invention.

An image projection system 10D shown in FIG. 8 has an image projection device 12, a screen 14B, a light absorption anisotropic layer 16A, and a B-plate 18. The B-plate 18 is disposed between the image projection device 12 and the screen 14B, and projection light passes through the B-plate.

The image projection system 10D according to the third embodiment has the same members as those of the image projection system 10C according to the second embodiment, except that the B-plate 18 is included. The same members are denoted by the same reference numerals and description thereof is omitted. Aspects of the B-plate 18 will be mainly described below in detail.

(B-Plate 18)

The B-plate 18 includes a positive B-plate and a negative B-plate. The positive B-plate satisfies a relationship of Expression (1) and the negative B-plate satisfies a relationship of Expression (2) assuming that a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz.

$$nz>nx>ny \quad \text{Expression (1)}$$

$$nx>ny>nz \quad \text{Expression (2)}$$

The thickness direction retardation of the positive B-plate is a negative value, and the thickness direction retardation of the negative B-plate is a positive value.

The in-plane retardation of the B-plate 18 at a wavelength of 550 nm is not particularly limited, but from the viewpoint that the effect of the present invention is further improved, it is preferably 120 to 300 nm, and more preferably 180 nm to 250 nm.

The absolute value of the thickness direction retardation of the B-plate 18 at a wavelength of 550 nm is not particularly limited, but from the viewpoint that the effect of the present invention is further improved, it is preferably 200 to 380 nm, and more preferably 240 to 350 nm.

The material constituting the B-plate 18 is not particularly limited, and may be a layer formed of a liquid crystal compound, or a resin film.

<Uses>

The image display system according to the embodiment of the present invention can be applied to various uses.

Examples thereof include an in-vehicle head-up display.

In a case where the image display system according to the embodiment of the present invention is used as an in-vehicle head-up display, a windshield of a vehicle is preferably used as a screen.

EXAMPLES

Hereinafter, the characteristics of the present invention will be described in greater detail with examples and comparative examples. Materials, used amounts, ratios, treatment contents, treatment procedures, and the like shown in the following examples are able to be properly changed unless the changes cause deviance from the gist of the present invention. Accordingly, the scope of the present invention should not be construed as being limited by the specific examples given below.

Example 1

A surface of a cellulose acylate film (TAC base material with a thickness of 40 μm; TG40, manufactured by FUJIFILM Corporation) serving as a support was saponified with an alkaline solution and coated with the following composition for forming a PVA alignment film also serving as a barrier layer using a wire bar. The support with the coating film formed thereon was dried with hot air at 60° C. for 60 seconds and further dried with hot air at 100° C. for 120 seconds to form a PVA alignment film also serving as a barrier layer, thereby obtaining a transparent support with a PVA alignment film also serving as a barrier layer. The film thickness of the PVA alignment film also serving as a barrier layer was 0.5 μm.

| (Composition for Forming PVA Alignment Film Also Serving as Barrier Layer) | |
|---|---|
| Modified polyvinyl alcohol shown below | 3.80 parts by mass |
| Initiator Irg2959 | 0.20 parts by mass |
| Water | 70 parts by mass |
| Methanol | 30 parts by mass |

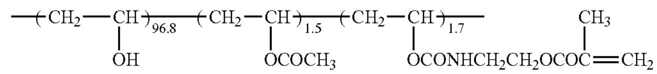

Modified Polyvinyl Alcohol

The PVA alignment film also serving as a barrier layer was subjected to a rubbing treatment and coated with the following composition for forming an inclined liquid crystal alignment film using a wire bar, and the coating film was heated with hot air at 120° C. for 30 seconds to form a dried film. Thereafter, the film was irradiated with a high-pressure mercury lamp for 1 second under an irradiation condition of an illuminance of 200 mW/cm$^2$, thereby preparing an inclined liquid crystal alignment film. The film thickness of the prepared inclined liquid crystal alignment film was 0.60 μm.

| Composition of Composition for Forming Inclined Liquid Crystal Alignment Film | |
|---|---|
| Low-molecular-weight liquid crystal compound M-1 shown below | 9.57 parts by mass |
| Polymerization Initiator IRGACURE OXE-02 (manufactured by BASF SE) | 0.41 parts by mass |
| Surfactant F-1 shown below | 0.026 parts by mass |
| Cyclopentanone | 66 parts by mass |
| Tetrahydrofuran | 66 parts by mass |

Low-Molecular-Weight Liquid Crystal Compound M-1

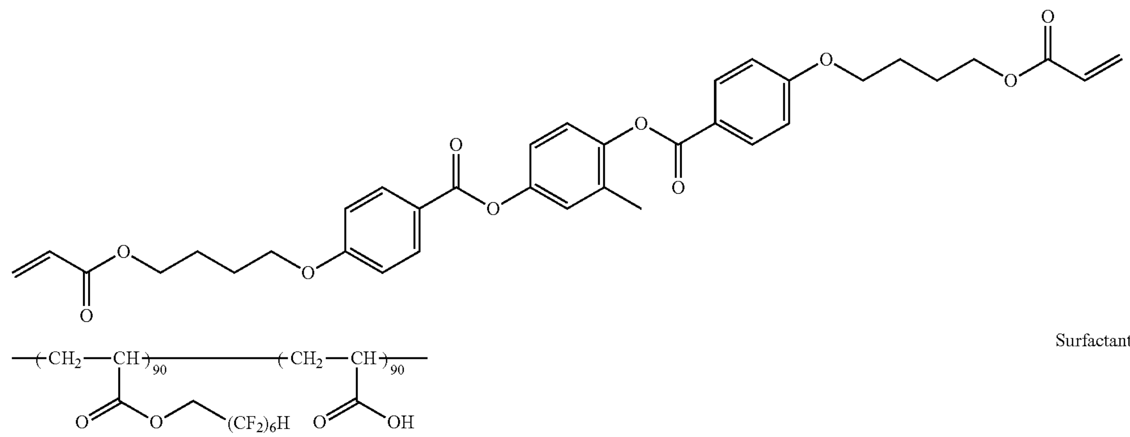

Surfactant F-1

The prepared inclined liquid crystal alignment film was coated with the following composition P1 for forming a light absorption anisotropic layer using a wire bar, and the coating film was heated with hot air at 120° C. for 30 seconds and cooled once to room temperature. Thereafter, the film was reheated at 80° C. for 60 seconds and cooled to room temperature again. Thereafter, the film was irradiated with an LED lamp (central wavelength of 365 nm) for 1 second under an irradiation condition of an illuminance of 200 $mW/cm^2$, thereby preparing a light absorption anisotropic layer P1 and obtaining an optical film 1 including the light absorption anisotropic layer P1. The film thickness of the prepared light absorption anisotropic layer P1 was 2.1 μm.

Further, the content of a dichroic substance in the composition P1 for forming a light absorption anisotropic layer was 21.7% by mass with respect to the total solid content of the composition P1 for forming a light absorption anisotropic layer.

| Composition P1 for Forming Light Absorption Anisotropic Layer | |
|---|---|
| Dichroic substance D-1 | 0.74 parts by mass |
| Dichroic substance D-2 | 0.33 parts by mass |
| Dichroic substance D-3 | 1.10 parts by mass |
| Polymer liquid crystal compound P-1 | 4.32 parts by mass |
| Low-molecular-weight liquid crystal compound M-1 | 3.17 parts by mass |
| Polymerization Initiator IRGACURE OXE-02 (manufactured by BASF SE) | 0.317 parts by mass |
| Surfactant F-2 | 0.010 parts by mass |
| Cyclopentanone | 51.4 parts by mass |
| Tetrahydrofuran | 51.4 parts by mass |

Dichroic Substance D-1

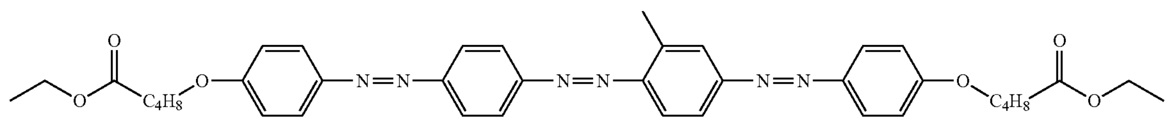

Dichroic Substance D-2

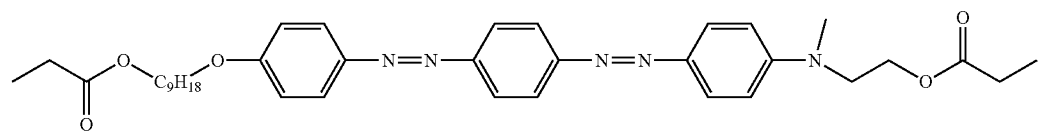

Dichroic Substance D-3

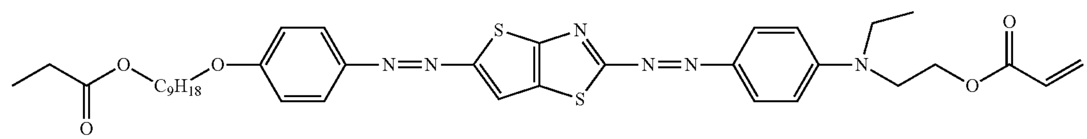

-continued

Polymer Liquid Crystal Compound P-1

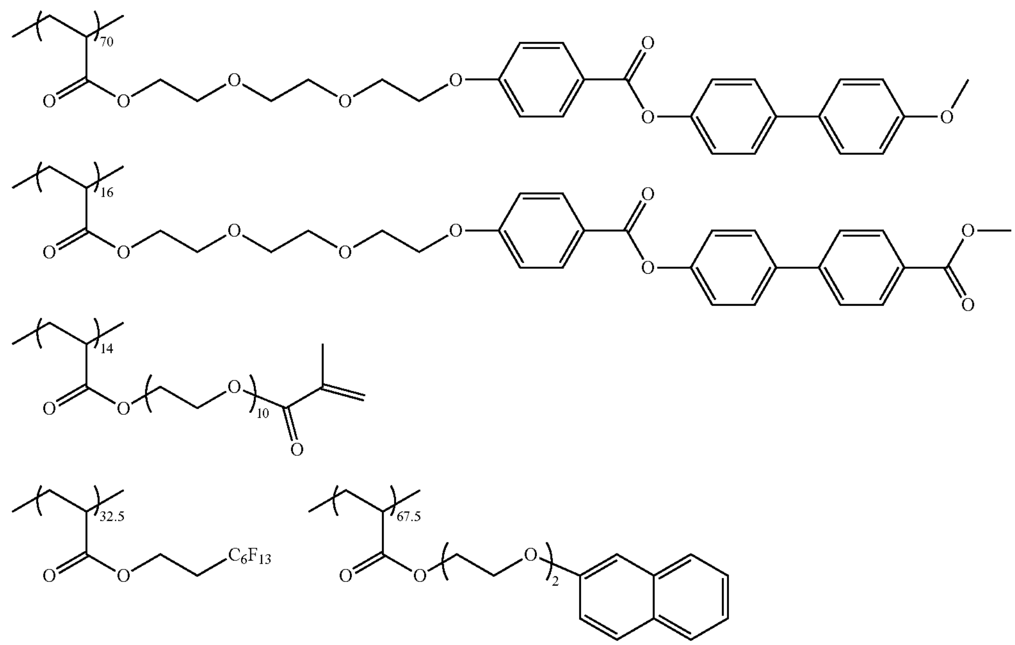

Surfactant F-2

The prepared light absorption anisotropic layer P1 was coated with the composition for forming a PVA alignment film also serving as a barrier layer using a wire bar and dried at 80° C. for 5 minutes. Next, the obtained coating film was irradiated with an LED lamp (central wavelength of 365 nm) for 2 seconds under an irradiation condition of an illuminance of 150 mW/$cm^2$ in an environment of an oxygen concentration of 100 ppm and a temperature of 60° C., thereby forming a barrier layer on the light absorption anisotropic layer P1. The thickness of the barrier layer was 1.0 μm.

An iPad (registered trademark) MD510/DA (manufactured by Apple Inc.) was used as an image projection device.

The optical film 1 including the light absorption anisotropic layer P1 prepared above was stuck on the iPad (registered trademark) using an optical pressure sensitive adhesive. In this case, the film was installed so that a transmittance central axis of the light absorption anisotropic layer P1 was orthogonal to the direction of the axis projected onto the surface of the light absorption anisotropic layer P1 and the absorption axis of the viewing-side polarizer of the iPad (registered trademark), and the surface of the optical film 1 opposite to the support side was opposed to the iPad (registered trademark).

Next, the image projection device in which the optical film 1 including the light absorption anisotropic layer P1 was disposed on the surface thereof and a screen 1 consisting of a glass plate were disposed as shown in FIG. 1, and thus an image projection system was prepared. The image projection device was horizontally installed, and the angle (polar angle) formed by a normal direction of the surface of the image projection device and a line connecting the center of the transmission window of the image projection device and the center of the projection light irradiation region on the screen 1 was 27°. The angle formed by the line connecting the center of the transmission window of the image projection device and the center of the projection light irradiation region on the screen 1 and the transmittance central axis of the light absorption anisotropic layer P1 was 17°. The transmittance central axis of the light absorption anisotropic layer P1 was further inclined toward the image projection device than the line connecting the center of the transmission window of the image projection device and the center of the projection light irradiation region on the screen 1, and the angle formed by the normal direction of the surface of the image projection device and the transmittance central axis of the light absorption anisotropic layer P1 was 44°.

Further, the azimuthal angle of the line connecting the center of the transmission window of the image projection device and the center of the projection light irradiation region on the screen 1 was parallel to the azimuthal angle of the transmittance central axis of the light absorption anisotropic layer P1.

In addition, as shown in FIG. 1, the transmittance central axis of the light absorption anisotropic layer P1 was in a direction toward the screen. More specifically, the screen (particularly, the projection light irradiation region) was disposed in a direction in which the transmittance central axis of the light absorption anisotropic layer P1 extended.

In addition, the position of an observer and the position and angle of the screen 1 were adjusted so that the image projected from the center of the image projection device reached a position substantially at the center of the screen 1.

Example 2

An image projection system was prepared according to the same procedure as in Example 1, except that a composition P2 for forming a light absorption anisotropic layer was used instead of the composition P1 for forming a light absorption anisotropic layer.

Further, the content of a dichroic substance in the composition P2 for forming a light absorption anisotropic layer was 13.0% by mass with respect to the total solid content of the composition P1 for forming a light absorption anisotropic layer.

| Composition P2 for Forming Light Absorption Anisotropic Layer | |
|---|---|
| Dichroic substance D-1 | 0.40 parts by mass |
| Dichroic substance D-2 | 0.18 parts by mass |
| Dichroic substance D-3 | 0.59 parts by mass |
| Polymer liquid crystal compound P-1 | 4.32 parts by mass |
| Low-molecular-weight liquid crystal compound M-1 | 3.17 parts by mass |
| Polymerization Initiator IRGACURE OXE-02 (manufactured by BASF SE) | 0.317 parts by mass |
| Surfactant F-2 | 0.010 parts by mass |
| Cyclopentanone | 51.4 parts by mass |
| Tetrahydrofuran | 51.4 parts by mass |

Example 3

A surface of a cellulose acylate film (TAC base material with a thickness of 40 μm; TG40, manufactured by FUJIFILM Corporation) was saponified with an alkaline solution and coated with the composition for forming a PVA alignment film also serving as a barrier layer using a wire bar. The support with the coating film formed thereon was dried with hot air at 60° C. for 60 seconds and further dried with hot air at 100° C. for 120 seconds to form an alignment film, thereby obtaining a TAC film with an alignment film. The film thickness of the alignment film was 1 μm.

The obtained alignment film was continuously coated with the following composition P3 for forming a light absorption anisotropic layer using a wire bar, heated at 120° C. for 60 seconds, and then cooled to room temperature (23° C.).

Next, the coating film was heated at 80° C. for 60 seconds and cooled to room temperature again.

Thereafter, the coating film was irradiated with an LED lamp (central wavelength of 365 nm) for 2 seconds under an irradiation condition of an illuminance of 200 mW/cm$^2$, thereby preparing a light absorption anisotropic layer P3 on the alignment film. The film thickness of the light absorption anisotropic layer P3 was 3.5 μm.

| Composition P3 for Forming Light Absorption Anisotropic Layer | |
|---|---|
| Dichroic substance D-1 | 0.63 parts by mass |
| Dichroic substance D-2 | 0.17 parts by mass |
| Dichroic substance D-3 | 1.13 parts by mass |
| Polymer liquid crystal compound P-1 | 8.18 parts by mass |
| IRGACURE OXE-02 (manufactured by BASF SE) | 0.16 parts by mass |
| Compound E-1 | 0.12 parts by mass |
| Compound E-2 | 0.12 parts by mass |
| Surfactant F-1 | 0.005 parts by mass |
| Cyclopentanone | 85.00 parts by mass |
| Benzyl alcohol | 4.50 parts by mass |

Compound E-1

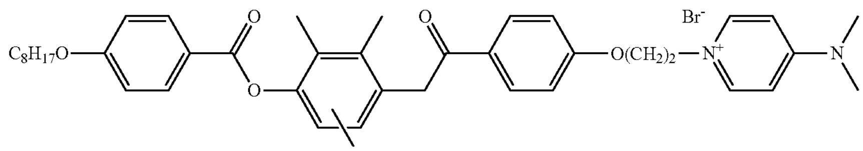

Compound E-2

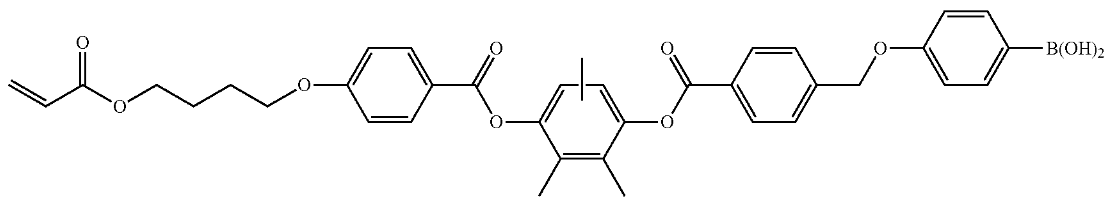

The obtained light absorption anisotropic layer P3 was continuously coated with the following composition for forming a tint adjusting layer using a wire bar to form a coating film.

Next, the support with the coating film formed thereon was dried with hot air at 60° C. for 60 seconds and further dried with hot air at 100° C. for 120 seconds to form a tint adjusting layer C1, thereby obtaining an optical film 3 including a light absorption anisotropic layer P3 and a tint adjusting layer C1. The film thickness of the tint adjusting layer was 0.5 μm.

| Composition for Forming Tint Adjusting Layer | |
|---|---|
| Modified polyvinyl alcohol shown above | 3.80 parts by mass |
| IRGACURE 2959 | 0.20 parts by mass |
| Coloring agent compound G-1 | 0.08 parts by mass |
| Water | 70 parts by mass |
| Methanol | 30 parts by mass |

Coloring agent compound G-1

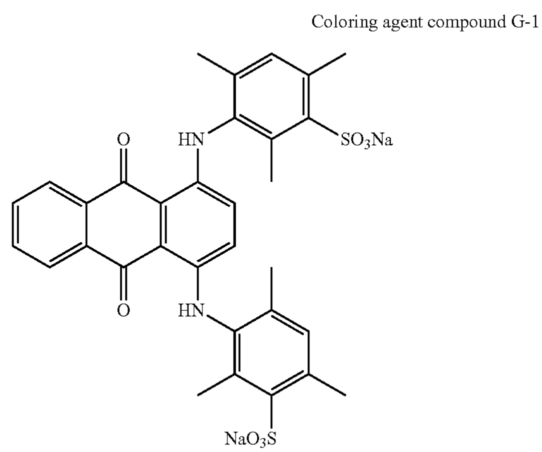

Next, instead of the optical film 1, the optical film 3 was used and stuck on the image projection device according to the same procedure as in Example 1. Further, the transmittance central axis of the light absorption anisotropic layer P3 was parallel to the normal direction of the surface of the light absorption anisotropic layer P3.

Next, the image projection device in which the optical film 3 including the light absorption anisotropic layer P3 was disposed on the surface thereof and a screen 1 were disposed as shown in FIG. 6, and thus an image projection system was prepared. The image projection device was horizontally installed, and the angle (polar angle) formed by a normal direction of the surface of the image projection device and a line connecting the center of the transmission window of the image projection device and the center of the projection light irradiation region on the screen 1 was 0°. The line connecting the center of the transmission window of the image projection device and the center of the projection light irradiation region on the screen 1 was parallel to the transmittance central axis of the light absorption anisotropic layer P3.

In addition, as shown in FIG. 6, the transmittance central axis of the light absorption anisotropic layer P3 was in a direction toward the screen. More specifically, the screen (particularly, the projection light irradiation region) was disposed in a direction in which the transmittance central axis of the light absorption anisotropic layer P3 extended.

In addition, the position of an observer and the position and angle of the screen 1 were adjusted so that the image projected from the center of the image projection device reached a position substantially at the center of the screen 1.

Example 4

An image projection system was prepared according to the same procedure as in Example 1, except that the film thickness of the inclined liquid crystal alignment film of Example 1 was changed from 0.60 μm to 1.0 μm.

In Example 4, the angle (polar angle) formed by a normal direction of the surface of the image projection device and a line connecting the center of the transmission window of the image projection device and the center of the projection light irradiation region on the screen 1 was 28°. The angle formed by the line connecting the center of the transmission window of the image projection device and the center of the projection light irradiation region on the screen 1 and the transmittance central axis of the light absorption anisotropic layer P1 was 11°. The transmittance central axis of the light absorption anisotropic layer P1 was further inclined toward the image projection device than the line connecting the center of the transmission window of the image projection device and the center of the projection light irradiation region on the screen 1, and the angle formed by the normal direction of the surface of the image projection device and the transmittance central axis of the light absorption anisotropic layer P1 was 39°.

Further, the azimuthal angle of the line connecting the center of the transmission window of the image projection device and the center of the projection light irradiation region on the screen 1 was parallel to the azimuthal angle of the transmittance central axis of the light absorption anisotropic layer P1.

In addition, the transmittance central axis of the light absorption anisotropic layer P1 was in a direction toward the screen. More specifically, the screen (particularly, the projection light irradiation region) was disposed in a direction in which the transmittance central axis of the light absorption anisotropic layer P1 extended.

Example 5

An optical functional layer HM-1 including a λ/2 retardation layer, a cholesteric liquid crystal layer 1, a cholesteric liquid crystal layer 2, and a cholesteric liquid crystal layer 3 in this order was prepared according to the procedure described in paragraphs "0101" to "0129" of WO2016/052367A.

The selective reflection center wavelength of the cholesteric liquid crystal layer 1 was 540 nm, the selective reflection center wavelength of the cholesteric liquid crystal layer 2 was 641 nm, and the selective reflection center wavelength of the cholesteric liquid crystal layer 3 was 761 nm. In addition, the in-plane retardation of the λ/2 retardation layer at a wavelength of 550 nm was 276 nm.

Using the obtained optical functional layer HM-1, a screen 2 in which the optical functional layer HM-1 was interposed between two glass plates was prepared according to the procedure described in paragraph 0130 of WO2016/052367A.

An image projection system was prepared according to the same procedure as in Example 4, except that the screen 2 was used instead of the screen 1.

Example 6

A screen 3 including a multilayer reflective film was prepared according to the procedure in Example 1 of JP2013-054350A. The multilayer reflective film had a structure in which two layers having different refractive indices were repeatedly laminated.

An image projection system was prepared according to the same procedure as in Example 4, except that the screen 3 was used instead of the screen 1.

Example 7

An image projection system was prepared according to the same procedure as in Example 5, except that in the image projection system, a B-plate consisting of a cycloolefin resin was disposed between the image projection device and the optical film including the light absorption anisotropic layer as shown in FIG. 8.

The in-plane retardation of the B-plate at a wavelength of 550 nm was 227 nm, and the thickness direction retardation of the B-plate at a wavelength of 550 nm was 285 nm.

Comparative Example 1

An image projection system was prepared according to the same procedure as in Example 1, except that the optical film 1 was not used.

<Evaluation>

An evaluation image was turned on in the image projection device in the image projection system obtained above, to evaluate the visibility of the image displayed on the screen and to also evaluate the brightness (nW) in the vicinity of the screen in a dark room.

In the image projection system, the distance between the image projection device and an observer was about 650 mm, and the distance between the image projection device and the screen was about 350 mm.

As the brightness in the vicinity of the screen in a dark room, a value at a wavelength of 520 nm was measured using a power meter (VEGA, manufactured by Ophir Optronics Solutions Ltd.) at a position in the vicinity of the screen.

As the evaluation image, an alphabetic character string in which the characters were displayed in RGB colors, respectively, was displayed on the screen, and the visibility was sensory evaluated according to the following criteria. The character size was adjusted to be about 3 cm on the screen.

Five observers were randomly selected, and each observer carried out the evaluation based on the following scores. The average of the scores was defined as final visibility and shown as "Visibility of Image on Screen" in Table 1. The observer began the actual evaluation operation after allowing his/her eyes to adjust to the dark room for about 30 minutes in advance.

| | |
|---|---|
| 1 point | Very difficult to visually recognize the evaluation image |
| 2 points | Difficult to visually recognize the evaluation image |
| 3 points | Normal |

-continued

| | |
|---|---|
| 4 points | Easy to visually recognize the evaluation image |
| 5 points | Very easy to visually recognize the evaluation image |

In Table 1, "Angle X" denotes an angle (°) formed by the transmittance central axis of the light absorption anisotropic layer and the normal direction of the light absorption anisotropic layer.

"Angle Y" denotes an angle (°) formed by the line connecting the center of the transmission window of the image projection device and the center of the projection light irradiation region on the screen and the transmittance central axis of the light absorption anisotropic layer.

"Content of Dichroic Substance (% by mass)" denotes the content of the dichroic substance (% by mass) with respect to the total mass of the light absorption anisotropic layer.

TABLE 1

| | Example 1 | Example 2 | Example 3 | Example 4 | Example 5 | Example 6 | Example 7 | Comparative Example 1 |
|---|---|---|---|---|---|---|---|---|
| Angle X | 44° | 44° | 0° | 39° | 39° | 39° | 39° | 44° |
| Angle Y | 17° | 17° | 0° | 11° | 11° | 11° | 11° | 17° |
| Screen Kind | Glass | Glass | Glass | Glass | Glass + Cholesteric Reflective Layer | Glass + Multilayer Reflective Layer | Glass + Cholesteric Reflective Layer | Glass |
| Content of Dichroic Substance (% by mass) | 21.7 | 13 | 21.7 | 21.7 | 21.7 | 21.7 | 21.7 | — |
| B-Plate | None | None | None | None | None | None | Provided | None |
| Brightness in Vicinity of Screen (The smaller the value, the darker it is) | 0.5 nW | 0.8 nW | 0.5 nW | 0.5 nW | 0.5 nW | 0.5 nW | 0.3 nW | 2.0 nW |
| Visibility of Image on Screen | 3.0 | 2.5 | 3.8 | 3.5 | 4.3 | 4.2 | 4.8 | 1.3 |

As shown in Table 1, the image projection system according to the embodiment of the present invention exhibited a desired effect.

Based on the comparison between Examples 1 and 2, it has been confirmed that the effect is further improved in a case where the content of the dichroic substance is 15% by mass or greater with respect to the total mass of the light absorption anisotropic layer.

In addition, based on the comparison between Examples 1 and 4, it has been confirmed that the effect is further improved in a case where the angle Y is within 15°.

As shown in Examples 5 and 6, it has been confirmed that the effect is further improved in a case where the screen has a reflective layer.

As shown in Example 7, it has been confirmed that the effect is further improved in a case where the B-plate is used.

EXPLANATION OF REFERENCES

10A, 10B, 10C, 10D: image projection system
12: image projection device
14A, 14B: screen
16A, 16B: light absorption anisotropic layer
18: B-plate
20: transmission window
22: irradiation region
30: support
32: reflective layer

What is claimed is:

1. An image projection system comprising:

an image projection device which emits projection light that is linearly polarized light;

a screen which is irradiated with the projection light emitted from the image projection device; and a light absorption anisotropic layer which is disposed between the image projection device and the screen and through which the projection light passes, wherein the light absorption anisotropic layer contains a dichroic substance, and a transmittance central axis of the light absorption anisotropic layer is in a direction toward the screen.

2. The image projection system according to claim 1, wherein an irradiation region for the projection light is present on the screen in a direction in which the transmittance central axis of the light absorption anisotropic layer extends.

3. The image projection system according to claim 2, wherein an angle formed by a line connecting a center of a transmission window of the image projection device and a center of an irradiation region for the projection light on the screen and the transmittance central axis of the light absorption anisotropic layer is 0° to 30°.

4. The image projection system according to claim 2, wherein the light absorption anisotropic layer contains the dichroic substance, and a content of the dichroic substance is 10.0% by mass or greater with respect to a total mass of the light absorption anisotropic layer.

5. The image projection system according to claim 2, wherein the screen includes a reflective layer which reflects the projection light.

6. The image projection system according to claim 5, wherein the reflective layer is a cholesteric liquid crystal layer or a multilayer reflective film.

7. The image projection system according to claim 2, further comprising: a B-plate which is disposed between the image projection device and the light absorption anisotropic layer and through which the projection light passes.

8. The image projection system according to claim 2, wherein the image projection system is used as an in-vehicle head-up display.

9. The image projection system according to claim 8, wherein a windshield of a vehicle is used as the screen.

10. The image projection system according to claim 1, wherein an angle formed by a line connecting a center of a transmission window of the image projection device and a center of an irradiation region for the projection light on the screen and the transmittance central axis of the light absorption anisotropic layer is 0° to 30°.

11. The image projection system according to claim 10, wherein the light absorption anisotropic layer contains the dichroic substance, and a content of the dichroic substance is 10.0% by mass or greater with respect to a total mass of the light absorption anisotropic layer.

12. The image projection system according to claim 10, wherein the screen includes a reflective layer which reflects the projection light.

13. The image projection system according to claim 12, wherein the reflective layer is a cholesteric liquid crystal layer or a multilayer reflective film.

14. The image projection system according to claim 10, further comprising: a B-plate which is disposed between the image projection device and the light absorption anisotropic layer and through which the projection light passes.

15. The image projection system according to claim 1, wherein the light absorption anisotropic layer contains the dichroic substance, and a content of the dichroic substance is 10.0% by mass or greater with respect to a total mass of the light absorption anisotropic layer.

16. The image projection system according to claim 1, wherein the screen includes a reflective layer which reflects the projection light.

17. The image projection system according to claim 16, wherein the reflective layer is a cholesteric liquid crystal layer or a multilayer reflective film.

18. The image projection system according to claim 1, further comprising: a B-plate which is disposed between the image projection device and the light absorption anisotropic layer and through which the projection light passes.

19. The image projection system according to claim 1, wherein the image projection system is used as an in-vehicle head-up display.

20. The image projection system according to claim 19, wherein a windshield of a vehicle is used as the screen.

21. The image projection system according to claim 1, wherein the dichroic substance includes a visible light absorbing substance.

* * * * *